Figure 1:
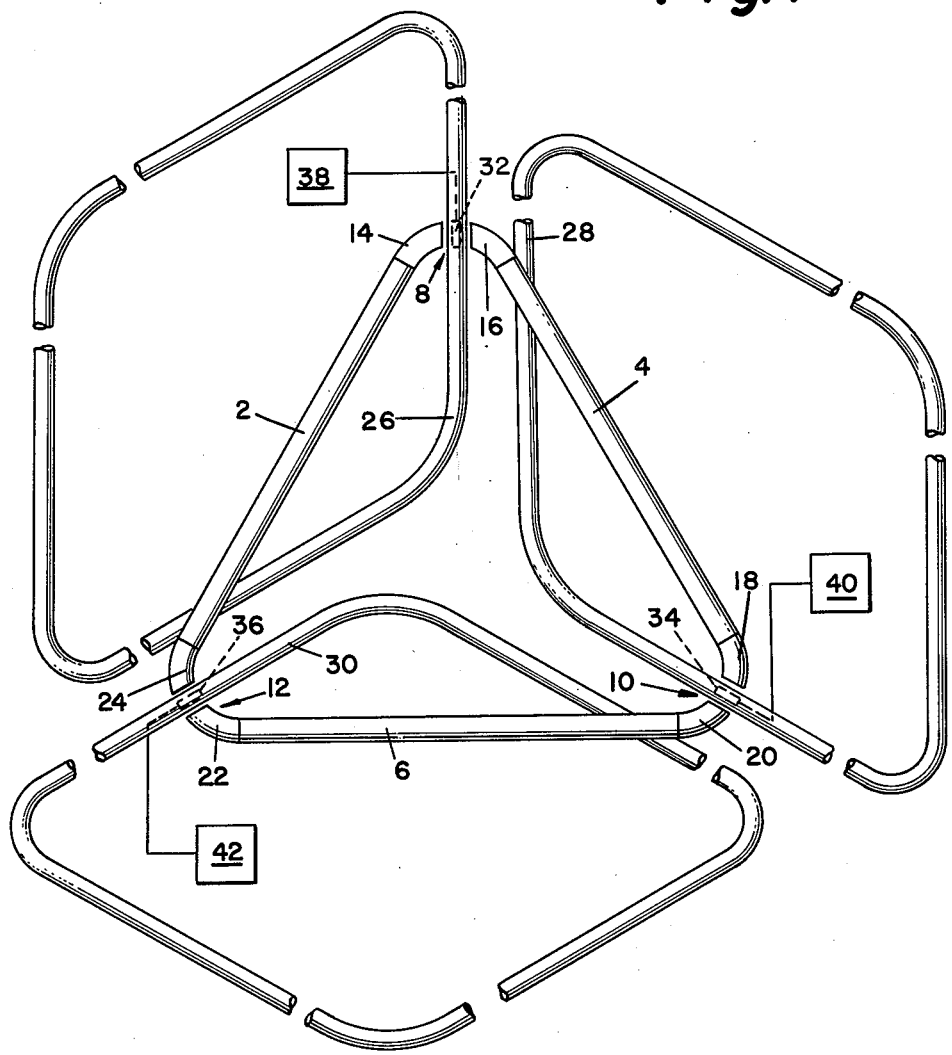

May 12, 1964     R. F. EDGAR     3,133,213
MAGNETIC STRUCTURE FOR PRODUCING MAGNETIC
FIELDS IN MORE THAN TWO GAPS

Filed Jan. 12, 1962     2 Sheets-Sheet 1

INVENTOR.
ROBERT F. EDGAR
BY Henry W. Kaufmann
AGENT

May 12, 1964  R. F. EDGAR  3,133,213
MAGNETIC STRUCTURE FOR PRODUCING MAGNETIC
FIELDS IN MORE THAN TWO GAPS
Filed Jan. 12, 1962  2 Sheets-Sheet 2
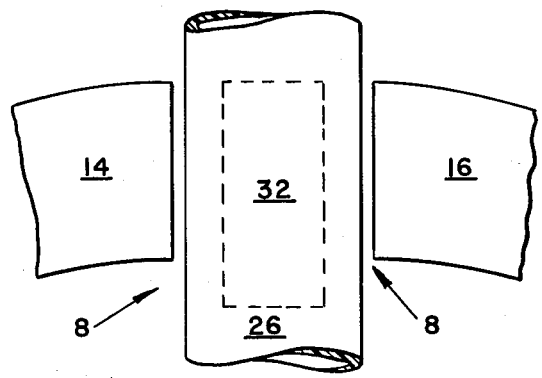
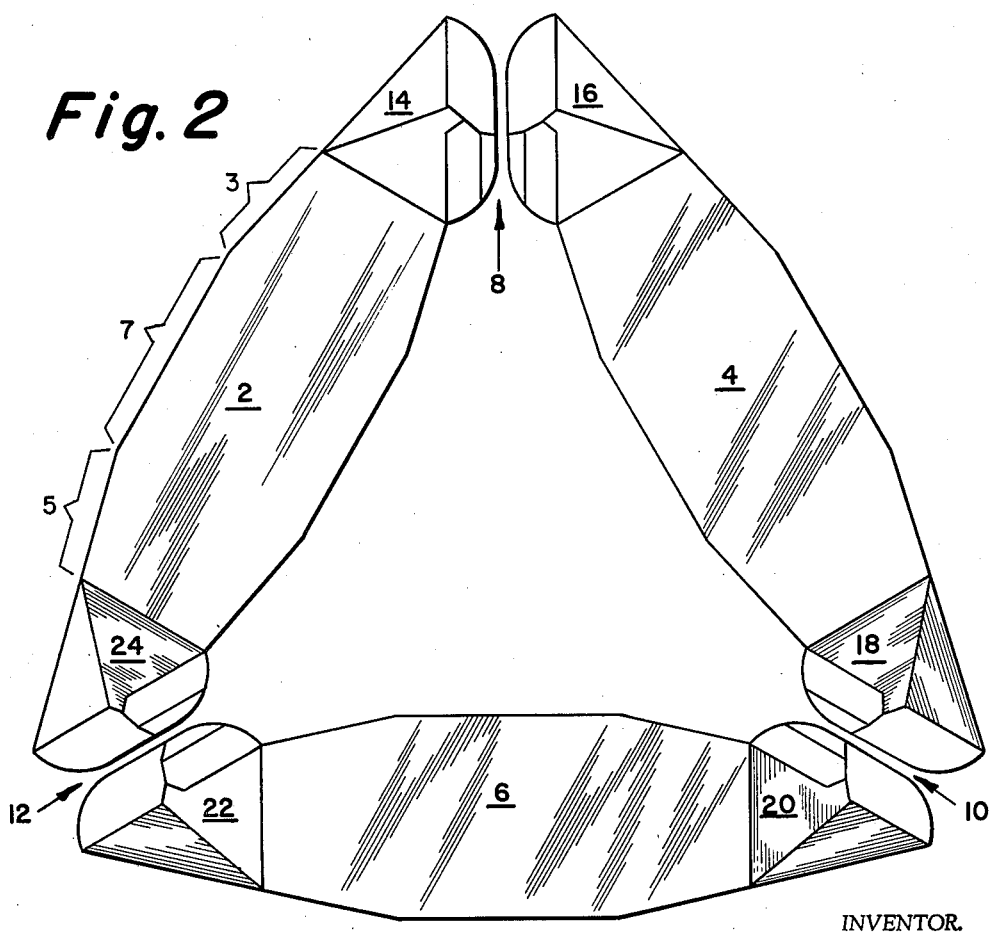
INVENTOR.
ROBERT F. EDGAR
BY Henry W. Kaufmann
AGENT

United States Patent Office 3,133,213
Patented May 12, 1964

3,133,213
MAGNETIC STRUCTURE FOR PRODUCING MAGNETIC FIELDS IN MORE THAN TWO GAPS
Robert Ferguson Edgar, Schenectady, N.Y., assignor to General Electric Company, a corporation of New York
Filed Jan. 12, 1962, Ser. No. 165,775
2 Claims. (Cl. 310—11)

This invention pertains to a magnetic structure useful for providing magnetic flux at a plurality of gaps therein.

It is known in the art to employ circuitally flowing liquids, particularly liquid metals, to produce the effect of gyroscopes or flywheels. Because they permit very ready control, and the elimination of sliding surfaces which must be sealed against the passage of liquid, electromagnetic pumps are very desirable for such devices. In general, such pumps comprise simply paired opposed electrodes for producing a flow of electric current through the liquid transversely to the desired direction of fluid flow, and means for producing a magnetic field transversely to the direction of electric current flow and to the desired direction of fluid flow. The usual means for providing such a magnetic field comprises a circuit of ferromagnetic material which is closed except for the gap where the liquid flows between pole pieces. An example is to be found in United States Patent 2,953,925, Yeadon, Fluid Mass Gyroscope, reference number 201.

The momentum of flowing fluid may be represented by a vector of length proportional to the angular momentum of the fluid flowing about it, and having the direction of the axis about which the fluid flow occurs (the sign being a matter of arbitrary convention). Since an advantage of the fluid flywheel is the ease with which the magnitude of the angular momentum may be altered by altering the magnitude (and direction) of the current flow through the electromagnetic pump, it is generally preferable to provide angular momentum of arbitrary direction in three-dimensional space by providing three fluid flywheels with mutually orthogonal axes, so that, by adjusting the relative magnitudes of the momenta provided by the three flywheels, it is possible to produce a resultant momentum in any desired direction; and the absolute magnitudes of the component momenta may be adjusted to provide a resultant of the desired magnitude (e.g. United States Patent 2,856,142, Haviland). However, conventional practice of simply assembling three conventional liquid gyroscopes, or flywheels, with conventional electromagnetic pumps and a separate magnetic structure for each such pump leads to a total weight triple the weight of a single such conventional assembly. I have found a design of magnetic structure which may be made lighter in weight than the conventional structure described, and having the further advantage that the high-coercivity material used for the magnetic structure (of which many examples are hard and quite difficult to form or machine) may readily be in the shape of a rod or bar, which is usually available as a stock item. One of the other advantages of my invention is that the magnetic flux through each of the gaps will be substantially equal, even though casual temperature or other changes should affect the different parts of the magnetic structure somewhat differently.

Thus the general object of my invention is to provide a lightweight magnetic structure for producing a magnetic field in a plurality of gaps; with other advantages, such as those described hereinabove.

To achieve the object of my invention, I provide a series magnetic circuit, with a number of pieces of preferably high-coercivity ferromagnetic material, which may be of simple bar or rod shape, each extending from the general proximity of one gap to the next successive gap. The actual gap proper may be formed by pole pieces of soft, readily machinable, ferromagnetic material extending from the end of the bar-shaped piece to the face of the gap. Thus there is formed a complete magnetic circuit, extending in series from one gap to the next, with a minimum of weighty magnetic material, since I eliminate the material which, in the conventional design, is required to close the magnetic path behind each gap.

For the better understanding of my invention I have provided figures of drawing representing a magnetic structure in accordance with my invention, in which FIGURE 1 represents partly schematically, in isometric projection, a basic structure according to my invention, including representations of fluid flywheels adapted to utilize my invention, FIGURE 2 represents a more sophisticated design of magnetic structure according to my invention, the items therein being numbered according to the reference desigtion used in FIGURE 1, and FIGURE 3 is an enlarged detail of the location of electrode pair 32 in gap 8.

Referring first to FIGURE 1, high-coercivity magnetic material—which may be in the shape of rods or bars, 2, 4, and 6, extends respectively between gaps generally designated as 8, 10, and 12, respectively. The distribution of magnetic flux at these gaps is controlled by high-permeability or magnetically "soft" material forming pole pieces 14 and 16, 18 and 20, and 22 and 24 at gaps 8, 10, and 12, respectively. The orientation of the pole pieces is such that the three gaps are at right angles to each other. Conduits 26, 28, and 30 contain respectively, the conductive liquid whose circulation produces angular momenta around three mutually orthogonal axes. Pairs of electrodes 32, 34, and 36 are represented located to produce current flow orthogonal to the direction of magnetic flux through the respective gaps 8, 10, and 12, and transverse to the passages through conduits 26, 28 and 30, respectively, FIGURE 3 being an enlarged detail of the location of electrode pair 32 in gap 8. Current sources 38, 40, and 42 are represented as connected to electrode pairs 32, 34, and 36, respectively. Since the electrode structure and the operation of fluid flywheels or gyroscopes by the application of current to the input electrodes of electromagnetic pumps is part of the known art, these current sources are not represented in detail, but only to the extent useful for complete representation of my invention.

It is evident that the magnetic structure according to my invention produces a series magnetic circuit in which the magnetomotive forces of pieces 2, 4, and 6 (it being required that these pieces be permanently magnetized longitudinally and so oriented that their magnetomotive forces are additive) drive flux through the soft iron pole pieces and across the gaps 8, 10, and 12. Since all the parts of the magnetic circuit are in series, the flux through the gaps will (except for leakage flux through the space outside the circuit) be equal in all; and any weakening of the magnetism of one of the pieces 2, 4, or 6 will tend to reduce the flux through all gaps equally. Similarly, armature reaction tending to weaken the flux through the gaps will act to affect all. Under conditions (which, on a probability basis, will be fairly frequent) when maximum current is being applied to only one of the pumps, this will spread the flux weakening out over the three gaps 8, 10, and 12 so that the field weakening in each individual gap will be less than if each gap were provided, in conventional fashion, with its separate permanent magnet.

It will be apparent from inspection of the figure that the total amount of magnetic material used for the structure represented is appreciably less than that required for three separate closed magnetic circuits. It has been found, in fact, that in a typical actual case a weight reduction of about 40 percent is achieved by design according to these teachings.

FIGURE 2 represents a magnetic structure of somewhat more sophisticated design, embodying my invention, by having pieces 2, 4, and 6 tapered to maintain approximately constant density of magnetic flux through them, the cross-section at the midpoints of the pieces being enlarged in order to provide additional cross-section for carrying the leakage flux. The tapered ends of piece 2 are designated by reference numbers 3 and 5, and the central portion, of enlarged cross section, is designated by reference number 7. In this embodiment, pieces 2, 4, and 6 were made of Alnico V, and pole pieces 14, 16, 18, 20, 22, and 24 were soft iron. The flux distribution measured at various points of this structure was as follows:

| | |
|---|---:|
| Total flux at the base of the tapered section of Alnico (maxwells) | 157,000 |
| Total flux at the end of the Alnico, base of the pole piece (maxwells) | 117,000 |
| Leakage flux from each tapered section of Alnico (maxwells) | 40,000 |
| Total flux into base of pole face (maxwells) | 82,000 |
| Leakage flux from back and sides of pole (maxwells) | 35,000 |
| Total flux into constant gap portion of gap (maxwells) | 17,000 |
| Fringing flux from curved portions of pole face (maxwells) | 65,000 |
| Maximum flux density at center of gap (gauss) | 18,600 |
| Flux density in the Alnico at the end of the bar (gauss) | 9,360 |
| Flux density in the Alnico at the base of the taper (gauss) | 10,150 |

In this structure, the length of pieces 2, 4, and 6 was 3¾ inches; their maximum diameter was 1⁵⁄₁₆ inches. Air gaps 8, 10, and 12 were 0.086 inch long, with the pole faces ¼ inch by ⁹⁄₁₆ inch.

While this description has referred to the use of permanent magnetic material, which is usually preferable, it is evident that the same structure may be applied to electromagnets by using soft magnetic material for parts 2, 4, and 6 and winding them with conductors for passage of magnetizing current, in conventional fashion. Also, if the total magnetomotive force produced by high-coercivity pieces 2, 4, and 6 is greater than is required to produce the desired flux at gaps 8, 10, and 12, one or more of them may be replaced with high-permeability, low coercivity, or magnetically "soft," material. The possibility of using stock shapes, and the advantages of equality of flux in all the gaps will still be largely preserved.

Other modifications in accordance with my basic teaching will be apparent to those skilled in the art.

What is claimed is:

1. In combination: a magnetic structure providing magnetic fields in more than two gaps, comprising pole pieces of ferromagnetic material defining the boundaries of the said gaps, and other pieces of ferromagnetic material equal in number to the number of said gaps each extending from a pole piece defining a boundary of one said gap to a pole piece defining a boundary of another said gap, to form a magnetic circuit, closed except for the said gaps, in which all the gaps are in series with the said magnetic circuit; and a plurality of separate conductors, located in the several said gaps, and connected to independent current sources for the flow of current through the said conductors.

2. In combination: a magnetic structure providing magnetic fields in more than two gaps, comprising discrete pole pieces of high-permeability low-coercivity ferromagnetic material defining the boundaries of the said gaps, and pieces of high-coercivity ferromagnetic material equal in number to the number of said gaps and each extending from a pole piece defining a boundary of one said gap to a pole piece defining a boundary of another said gap, only one said high-coercivity piece extending from any said pole piece, each said high-coercivity piece being tapered at its ends and of enlarged cross section in its central portion, the enlargement of the cross section of the said central portion being such that the flux into the said pole pieces plus the leakage flux from the said ends is carried by the said central portion at substantially the same total flux density as exists in the said ends; and a plurality of separate conductors, located in the several said gaps, and connected to independent current sources for the flow of current through the said conductors.

References Cited in the file of this patent

UNITED STATES PATENTS 1,334,531   Folker et al. _____ Mar. 23, 1920

FOREIGN PATENTS 175,457   Switzerland _____ May 1, 1935